J. A. HOLMES.

Show Case.

No. 106,586.

Patented Aug. 23, 1870.

Witnesses

Inventor
John A. Holmes
PER
Munn & Co

UNITED STATES PATENT OFFICE.

JOHN A. HOLMES, OF SHOPIERE, WISCONSIN.

IMPROVEMENT IN SHOW-CASES.

Specification forming part of Letters Patent No. 106,586, dated August 23, 1870.

*To all whom it may concern:*

Be it known that I, JOHN A. HOLMES, of Shopiere, in the county of Rock and State of Wisconsin, have invented a new and useful Improvement in Show-Cases; and I do hereby declare that the following is a full, clear, and exact description thereof, which will enable others skilled in the art to make and use the same, reference being had to the accompanying drawings, forming part of this specification.

This invention relates to improvements in show-cases; and it consists in the application, to a case arranged to revolve, of reflecting-mirrors, which are placed at an angle of about ninety degrees, for repeating the reflections of the articles to be exhibited, and which are suspended or otherwise suitably arranged between said mirrors, as hereinafter described.

Figure 1:
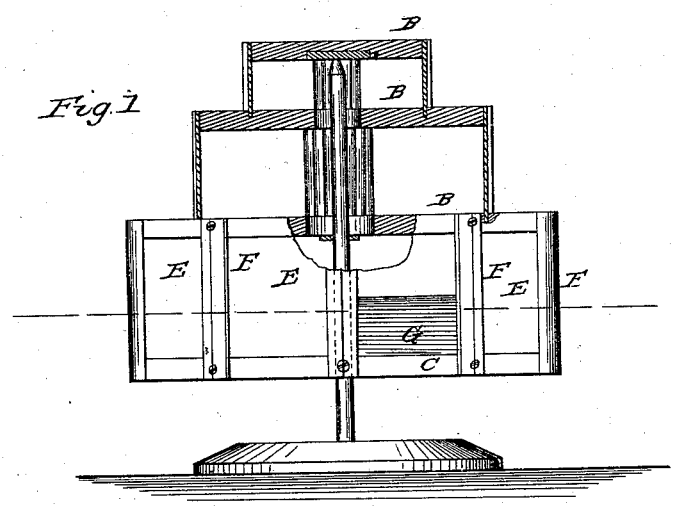
Figure 2:
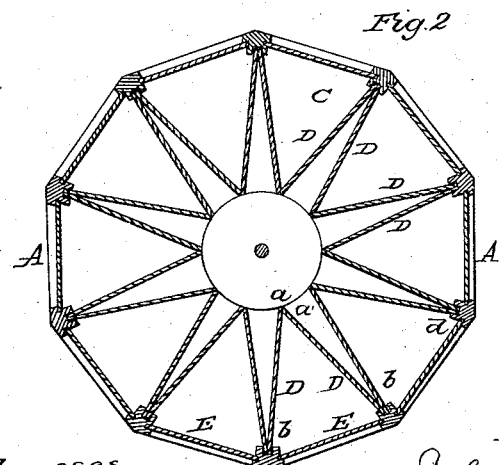

Figure 1 is a view of a show-case arranged according to my invention, and shown partly in elevation and partly in section; and Fig. 2 is a horizontal section of the same.

Similar letters of reference indicate corresponding parts.

A represents a revolving show-case, with numerous plane sides, arranged in three tiers, with dividing-plates B separating each tier, and with the bottom plate, C, whereon the articles to be exhibited are placed between mirrors D, set edgewise between the plates C B, B B, and B B', as shown, forming the angles *a b d*, which may be more or less acute, as preferred, for multiplying the reflections of the articles so placed between them. E represents plain glasses placed in front of these spaces, to inclose them and retain the articles therein. The mirrors are supported in their positions by being placed in grooves in the plates C B and the posts or bars F, as shown; or they may be arranged in any other approved way. Instead of glass mirrors, any suitable reflectors may be used.

In some cases I propose to use mirrors for closing the lower parts of the front openings on the lines *b d*, as shown at G, with plain glass at the top, through which the articles within may be seen, while they will be reflected and again multiplied between the mirrors G below and the mirrors D, with which latter the one G forms the requisite angles.

The front glass plates, E, may be raised up for opening the case, for applying or removing the articles to be exhibited.

The revolving cases may have clock-work or other means for turning them.

These show-cases may be made of any suitable material and in any approved form.

Having thus described my invention, I claim as new and desire to secure by Letters Patent—

A revolving show-case for exhibiting goods, divided into compartments by mirrors, arranged at an angle of about ninety degrees, so as to reflect and multiply reflections of the articles placed in it, substantially as specified.

JOHN A. HOLMES.

Witnesses:
JOHN W. THOMAS,
JOHN J. VAN WIE.